Jan. 3, 1956
J. R FORMAN
2,729,460
COLLAPSIBLE LUGGAGE DOLLY
Filed May 11, 1953
2 Sheets-Sheet 1
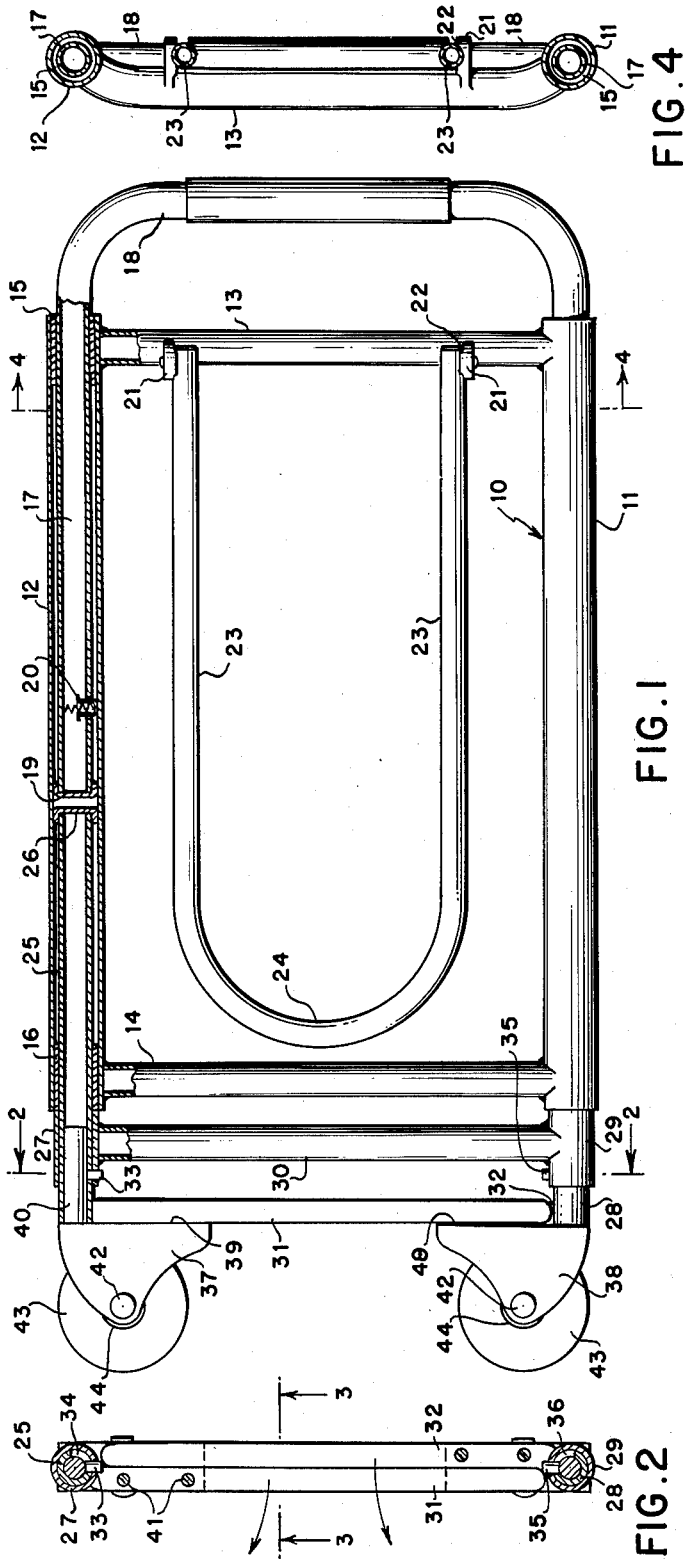
INVENTOR.
Julie R. Forman
BY Walter S. Pleston
ATTORNEY Jan. 3, 1956

J. R. FORMAN 2,729,460

COLLAPSIBLE LUGGAGE DOLLY

Filed May 11, 1953

2 Sheets-Sheet 2

INVENTOR.
Julie R. Forman
BY Walter S. Pleston

ATTORNEY

United States Patent Office 2,729,460
Patented Jan. 3, 1956

2,729,460

COLLAPSIBLE LUGGAGE DOLLY

Julie R. Forman, Litchfield, Conn.

Application May 11, 1953, Serial No. 354,029

Claims priority, application Germany May 13, 1953

9 Claims. (Cl. 280—40)

The invention relates to a collapsible luggage dolly of the type which can be attached to a piece of luggage in its collapsed state. A dolly of the mentioned type is the subject matter of my U. S. Patent No. 2,602,675 of July 8, 1952.

The dolly according to that patent essentially comprises a frame consisting of longitudinal and transverse members in the same plane, a handle and a wheel-carrying extension in telescopic relationship to the frame, and a foot and a back structure turnable each about a transverse axis into and out of a position flush with the frame.

Now, I have found that a dolly of the mentioned type has certain drawbacks. One of the drawbacks consists in that the back structure must be held by a latch or detent in the erected position when the dolly is to be rolled along with a piece of luggage thereon and that such structure is not sufficiently resistant to heavy loads unless it is made very rugged and, therefore, bulky. Furthermore, the collapsed dolly in which all frame members are in the same plane does not slide easily on the floor on which it may rest with its entire frame including the wheel structure during certain uses.

The present invention aims to avoid the mentioned drawbacks by providing a collapsible dolly attachable to a piece of luggage and in which the back structure comprises members turnable about longitudinal rather than transverse axes so that they are unmovable in the direction of any loading force acting thereon.

The invention further aims to provide a dolly which, in the collapsed state and attached to a piece of luggage, can easily slide on a floor in the direction of the transverse members serving as runners, and wherein the structure facilitating such sliding is also advantageous for other reasons.

Figure 7:
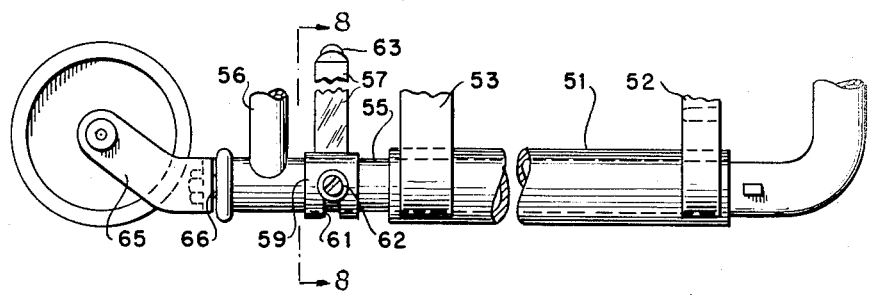
Figure 9:
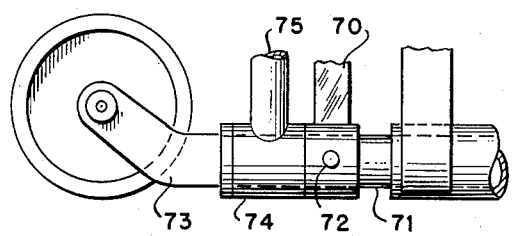
Figure 6:
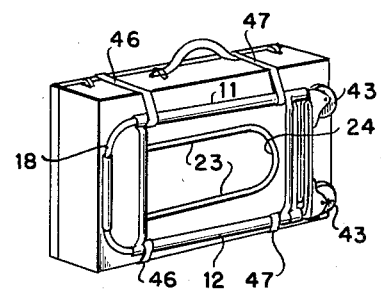
Figure 8:
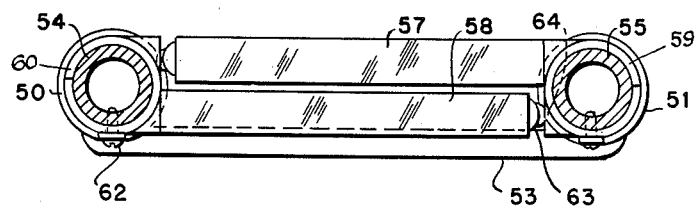

Other objects and details of the invention will be apparent from the description given hereinafter and the accompanying drawing illustrating an embodiment thereof by way of example. In the drawing, Fig. 1 is a top plan view partly in section of a dolly according to the invention, Fig. 2 is a section along line 2—2 of Fig. 1, Fig. 3 is a section along line 3—3 of Fig. 2, Fig. 4 is a section along line 4—4 of Fig. 1, Figs. 5 and 6 are perspective views of the dolly in its open state and in its collapsed state, respectively, and attached to a piece of luggage, Fig. 7 is a bottom plan view of a portion of a modified dolly, Fig. 8 is a section along line 8—8 of Fig. 7, and Fig. 9 is a bottom plan view of a portion of another modification.

Referring now to the drawing, the dolly according to Figs. 1 to 6 comprises a main frame 10 preferably made of aluminum tubes and consisting of two longitudinals 11 and 12 and two transverse members 13 and 14 secured to the longitudinals by any suitable means, e. g. by welding. The plane in which the transverse members are located is slightly below the plane defined by the longitudinals as clearly shown in Fig. 4. It is true that in consequence thereof the thickness of the frame is slightly greater than the dolly of the mentioned patent. However, the slight inconvenience which may be caused thereby is by far surpassed by the advantages offered by the off-set transverse members, thus constituting sled-like runners on which even heavy loads can easily slide. Each longitudinal is provided with a short interior bushing 15 at its front end and 16 at its rear end. Within the front bushings 15 the legs 17 of a U-shaped handle 18 are telescopically slidable. Each of the rear ends of the legs is closed by a cap 19 which abuts with its rim against the coordinate bushing 15 when the handle is pulled out, and prevents the separation of the latter from the frame. A spring-loaded detent 20 is projectably mounted in each of the legs 17, and engages the forward end of the bushing 15 of the associated longitudinal in the extended end position of the handle 18 thereby preventing the latter from being pushed back unless the detents are first pressed in. Two small brackets 21 are welded to the transverse member 13. The brackets are so recessed at 22 that they can receive the ends of the legs 23 of a U-shaped foot member 24 and to hold the latter in two end positions, in the first one of which the foot 24 is located in the plane of the longitudinals 11 and 12 whereas in the second position the foot projects downwardly as shown in Fig. 5. Owing to the resiliency of the U-shaped foot structure there is a resistance to the turning of the foot from the one into the other position.

In the illustrated preferred form of the dolly, a collapsible back structure and wheel carrying means are combined into one protractable unit. For this purpose, an extension tube 25 is telescopically slidable within the bushing 16 in the rear end of longitudinal 12. The tube 25 is provided with a cap 26 at its inner end and with a sleeve 27 at a short distance from its outer end. Both the cap and the sleeve are rigidly secured to the tube and limit the inward and outward shift of the latter by abutting against the bushing 16. Similarly, an extension tube 28 with sleeve 29 is associated to the longitudinal 11. A transverse member 30 is rigidly connected to the sleeves 27 and 29. Two rod-like or tubular struts 31 and 32 preferably but not necessarily of rectangular cross-section, and constituting the members of the back structure are secured, e. g. by welding, to the ultimate ends of the extension tubes 25 and 28, respectively, so as to project at right angles from the latter. The struts 31 and 32 can be turned with the associated extension tubes about the axes of the longitudinals from the collapsed position in which they are parallel to the transverse member 30 into the open position in which they are erected on the upper side of the frame. In order to render it possible that both struts move in the same plane, they are secured eccentrically with respect to their associated extension tubes 25 and 28 as clearly shown in Figs. 2 and 3 so that, in the collapsed position the strut 31 bears flat on top of strut 32. Preferably, the cross-section of the struts is so dimensioned that their combined thickness does not exceed the size of the diameter of the frame longitudinals. The struts must not be longer than the transverse member 30 so that each strut can be accommodated between the two extension tubes 25 and 28 as shown in Fig. 1. However, it is of course possible to provide the struts with telescopic or otherwise retractable extensions similar to those shown in connection with the back structure of my above mentioned patent. In order to limit the angle through which each strut is turnable, a pin 33 is fixed in the sleeve 27 so as to project into a slot 34 of the extension tube 25. Similarly a pin 35 in sleeve 29 engages a slot 36 in extension tube 28. The length of the slots determines the mentioned angle.

Wheel-carrying brackets 37 and 38 are also secured to the extension tubes 25 and 28, respectively. The brackets are of channel-shaped cross-section and of substantially triangular form. The web of each channel constituting one of the sides of the triangle extends at right angles to the associated extension tube. As shown in Fig. 1 with respect to bracket 37, the one end of the web 39 has a shank-like projection 40 inserted into the tube 25 so that the web 39 bears lengthwise against the strut 31. The bracket may be secured by any suitable means to the tube 25 and strut 31. In the illustrated embodiment, the shank 40 has a press-fit in the tube 25, and screws 41 positively connect the web 39 to the strut 31. In a similar manner the bracket 38 is secured to the tube 28.

It will be noticed that the width of each bracket web is approximately equal to the combined thickness of the struts 31 and 32, i. e. approximately equal to the diameter of the frame longitudinals, and that each strut is secured with its root portion lengthwise of the web to half of its width so that the free end portion of the other strut can engage the space between the other half of the width of the web and the root portion of the other strut. In the corner of each triangular bracket opposite the web, a pin 42 is passed through the flanges of the channel and carries a wheel 43 which may be provided with a ball bearing indicated at 44. Now, it will be clear that the wheels lie in the plane of the frame 10 when the dolly is collapsed as in Fig. 1, but that the planes of the wheels will be at right angles to the frame when the dolly is opened for use as in Fig. 5.

In some instances it is preferred that the pins 42 on the upper side of the brackets in Fig. 1 are flush with the brackets and that the latter do not project beyond the thickness of the frame. On the lower side, however, as clearly shown in Fig. 3, the pins may have protruding heads 45, provided that the heads do not project farther downward than the bottom plane of the transverse members 13 and 14. In order to prevent the rods from turning when not desired, the aforementioned pins 33 and 35 may project so far inwardly that they press against the shanks 40 and create some frictional resistance. Furthermore, some resilient pressure may be caused between the rod 31 and the back of the bracket 38 at 48 in the position of Fig. 1.

The collapsed dolly can be attached to a piece of luggage by means of the straps 46 and 47 as shown in Fig. 6, and carried together with the piece of luggage without substantially increasing the bulk of the latter. Lying flat on the floor, it can be readily slid on the protruding transverse members which serve as runners, e. g. underneath a cabin berth or compartment seat. Without removing the dolly from the piece of luggage, the handle can be pulled out as well as the rear structure. In this position the back struts or rods, first the rod 31 and then rod 32, may be turned up in the direction of the arrows in Fig. 2. Thereby the wheels are also turned in the correct position for rolling the dolly along. Additional pieces of luggage can be placed against the upwardly projecting back struts. The dolly can be readily collapsed while attached as no parts project upwards from the frame once the struts and wheels have been turned back into the position of Fig. 1.

It has been stated that the width of the webs 39 of the brackets and the combined thickness of the struts 30 and 31 preferably are not larger than the diameter of the longitudinals. This is so in order to prevent any part from projecting beyond the top most plane of the longitudinals, because otherwise it may not be quite easy to protract e. g. the back and wheel structure while the collapsed dolly is attached to a piece of luggage. However, this limitation is necessary only if the axes of the bracket shanks 40 are located in the center planes of the brackets. Otherwise, almost the entire distance between the bottom plane of the runners and the top plane of the longitudinals may be utilized to accommodate brackets and struts of larger dimensions in the collapsed state.

In the modification of Figs. 7 and 8 the longitudinals 50 and 51 are connected by transverse members 52 and 53. Tubular extensions 54 and 55 slidable in the longitudinals 50 and 51, respectively, are connected by a third transverse member 56 which is rigidly secured to the extensions and prevents the latter from turning. Back struts 57 and 58 are provided with foot sleeves 59 and 60 which embrace the tubes 54 and 55 and can turn about the axes of the latter. The angle through which a back strut can turn is limited to 90° as in the case of the embodiment of Figs. 1 to 6. As shown in Fig. 7 with respect to the strut 57, the sleeve 59 is provided with a slot 61 engaged by a screw 62 which is screwed into the tube 55. It will be noticed that the struts 57 and 58 are eccentric with respect to the sleeves 59 and 60 so that they can lie the one on top of the other in the collapsed state of Fig. 8. The outer end of each strut is provided with a ball 63 which can engage a little indentation 64 of the sleeve of the other strut so as to act as a detent in the collapsed position of the dolly. In the modification of Figs. 7 and 8 a wheel bracket 65 is secured to the end of each of the extension tubes by means of a swivel joint 66.

In the modification of Fig. 9 the back strut 70 is secured to the extension tube 71 by means of a pin 72 and the wheel bracket 73 is also rigidly secured to the end of that tube by means not shown. In consequence the tube 71 with the associated rod 70 and wheel bracket 73 can be turned as an entirety from the collapsed position into the position for rolling in a manner similar to that described with respect to the embodiment of Figs. 1 to 6. Each extension tube can turn in a sleeve 74 arranged between the rod 70 and the wheel bracket, and the sleeves are connected by the transverse member 75. In all other respects the modifications of Figs. 7, 8 and 9 are similar to the embodiment of Figs. 1 to 6, preferred in view of its simple structure and great strength owing to the reinforcing effect of the brackets which add to the rigidity of the back struts.

It will be apparent to those skilled in the art that many alterations and modifications of the structure shown and described can be made without departure from the essence and spirit of the invention which for that reason shall not be limited but by the scope of the appended claims.

I claim:

1. In a collapsible luggage dolly having a substantially plane frame including a pair of parallel tubular longitudinals, the combination of a pair of rearward extension members in telescopic relationship to said longitudinals, a transverse member connecting said extension members so as to ensure their common movement in the axial direction of said longitudinals, two back struts attached to said extension members, respectively, in the same plane at right angles and eccentrically in relation to the axes of said extension members, each of said struts being turnable about the axis of the associated extension member, said struts having a first end position in which they are parallel to said transverse member and in which the one strut bears lengthwise on the other with its free end adjacent the extension member associated to said other strut, said struts having a second end position in which said struts are directed at right angles to and upwards of the plane of said frame, and a wheel-carrying bracket secured to the ultimate end of each extension member.

2. A dolly as claimed in claim 1, further comprising two sleeves turnable on said extension members, respectively, each of said struts being rigidly connected to one of said sleeves, said transverse member being rigidly secured to said extension members, and said wheel-carrying bracket being swivellingly attached to the end of each of said extension members.

3. A dolly as claimed in claim 1, further comprising two second spaced transverse members secured to said longitudinals, said second transverse members projecting below said longitudinals, the combined thickness of the superimposed struts in said first position being less than the distance between the bottom plane of said second transverse members and the top plane of said longitudinals.

4. A collapsible luggage dolly comprising a substantially plane frame including a pair of tubular longitudinals and two runner-forming transverse members protruding slightly below said longitudinals, a pair of rearward extension members in telescopic relationship to said longitudinals, two sleeves one on each of said extension members, said extension members being turnable each in the associated sleeve and longitudinal, a third transverse member rigidly connected to said sleeves, first means in connection with each sleeve and the associated extension member to prevent relative movement thereof in the axial direction, two back struts rigidly secured to the outer end portions of said extension members, respectively, in the same plane at right angles and eccentrically in relation to the axes thereof, second means in connection with each of said extension members and a part non-rotatable with respect to said longitudinals, to determine two end positions of said struts, in the first one of which said struts are superimposed and parallel to said third transverse member, and in the second of which the struts are erected at right angles to the plane of said frame, and two substantially channel shaped wheel-carrying brackets secured to the ultimate ends of said extension members and to said struts respectively.

5. A dolly as claimed in claim 4, wherein said first and second means comprise two pins secured to said sleeves, respectively, and projecting inwardly, said pins being in engagement with slots in said extension members.

6. A dolly as claimed in claim 4, said extension members being tubular, each of said brackets being of channel-shaped cross-section and including a shank projecting from the back of the channel web, said shank being inserted into the outer end of the associated extension member, and the back of said web bearing lengthwise against the associated strut and being rigidly secured thereto.

7. A dolly comprising a substantially planiform, load-supporting frame, a strut and a wheel support bracket at each side of the frame, the strut and bracket of each side of the frame being mounted for pivotal movement about a common axis extending longitudinally of the frame in the plane thereof, between a collapsed position in the plane of the frame and a use position normal to said plane, said struts extending in the collapsed position eccentrically, the one above and the other one below said first named axes, respectively, in a common plane and bearing the one on the other in overlapping relation, substantially between the bottom plane and the top plane of said frame and wheels mounted on the respective brackets for rotation thereupon about axes normal to the first named axes.

8. A dolly as claimed in claim 7, further comprising releasable detent means operative between the free end of each strut and the opposite end of the other strut to hold said struts in the collapsed position.

9. A dolly comprising a substantially planiform, load-supporting frame, a wheel support bracket and a strut at each side of the frame, the strut and bracket of each side of the frame being rigidly connected and being pivoted relative to the frame about an axis extending longitudinally of the frame in the plane thereof, said strut and bracket swinging between a collapsed position in the plane of the frame and a use position normal to said plane, the respective struts swinging in a common plane between said collapsed and use positions thereof and being extended in longitudinally contacting, overlapping relation in said collapsed positions, and wheels mounted on the respective brackets for rotation thereupon about axes normal to the axes about which their associated brackets are swingable.

References Cited in the file of this patent

UNITED STATES PATENTS

| 863,972 | Ehlers | Aug. 20, 1907 |
| 1,772,951 | Klein | Aug. 12, 1930 |
| 2,602,675 | Forman | July 8, 1952 |

FOREIGN PATENTS

| 990,506 | France | Sept. 24, 1951 |
| 619,397 | Great Britain | Mar. 9, 1949 |